July 14, 1959 G. M. RAPATA 2,894,425
ELASTIC RETAINING RING WITH TAB TO FACILITATE REMOVAL
Filed June 22, 1954
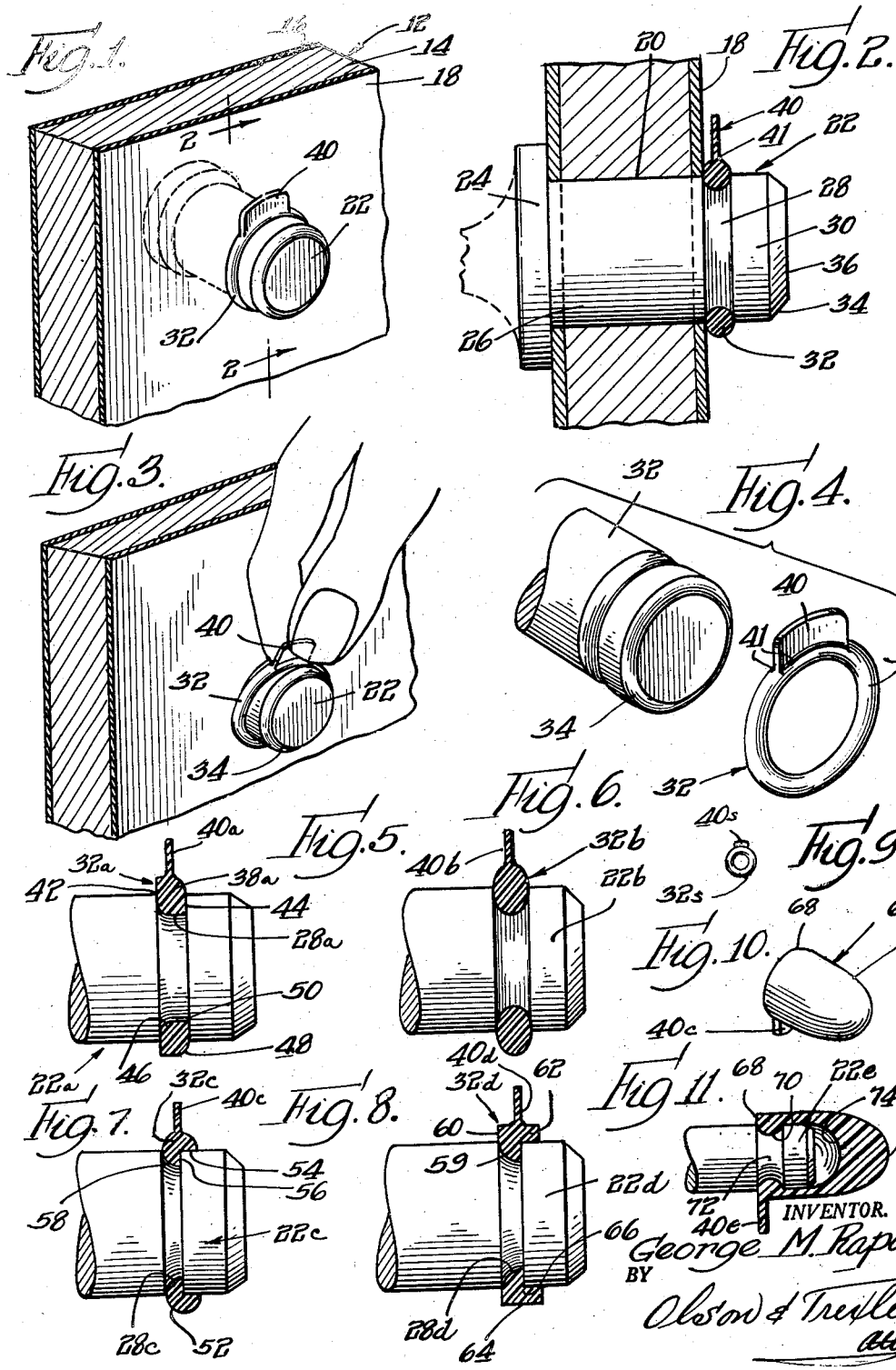
INVENTOR.
George M. Rapata
BY
Olson & Trexler
Attys.

United States Patent Office 2,894,425
Patented July 14, 1959

2,894,425

ELASTIC RETAINING RING WITH TAB TO FACILITATE REMOVAL

George M. Rapata, Chicago, Ill., assignor to Illinois Tool Works, Chicago, Ill., a corporation of Illinois Application June 22, 1954, Serial No. 438,508

3 Claims. (Cl. 85—8.8)

This invention relates to retaining rings used on shafts or studs grooved to receive the same.

It has been suggested in the past to use retaining rings on circumferentially grooved shafts to prevent axial displacement of elements mounted on or supported by the shafts when rather light axial loads are encountered, but it has been found that these rings are difficult to remove. It has also been found that because of the difficulty in removing the rings, they are damaged or destroyed in the removing process, thereby making replacement necessary. This difficulty is occasioned by the fact that the ring, to have the necessary retaining qualities, must be deeply embedded in the groove on the shaft, leaving a limited surface of the ring exposed which cannot readily be gripped for removing the same, thus requiring the use of a sharp or pointed instrument.

It is therefore an object of this invention to provide an elastic retaining ring of the foregoing character which is more readily removed than any heretofore known and which is not damaged in removal. More specifically, it is an object of the present invention to overcome the difficulty of removal by providing the elastic ring with an integral tab to facilitate removal.

It is another object of the present invention to provide for the removal of an elastic retaining ring without the use of special tools.

It is a further object of the present invention to provide a ring of varying cross-section to meet the many and different commercial requirements.

It is another object of this invention to provide a ring that cannot be accidentally displaced.

It is contemplated that the present invention be used in connection with grooves of varying cross-section, and therefore another object of this invention is to so shape the cross-section of the ring to fit grooves of different cross-section.

It has also been found that in manufacturing rings in accordance with conventional practice, two points of weakness occur. These points are at the inlet or die port in the molds, and at the point farthest away from the die port. The first weakness results from the breaking off of the stem extending into the die port after the rings have been molded. The second point of weakness, diametrically opposite the die port, results from deformations in the ring caused by the cooling of the liquid plastic before it reaches the extremity of the mold.

It is an object of the present invention to provide an integral tab at the point or points of weakness and thereby to strengthen the ring. A single tab may be provided at the die port or extremity, or two tabs may be used thereby strengthening both points.

The foregoing and other objects and advantages will be more apparent from the following detailed description when considered with the accompanying drawings wherein:

Fig. 1 is a perspective view showing my improved elastic ring associated with work pieces and a circumferentially grooved post or stud;

Fig. 2 is a longitudinal sectional view taken along the line 2—2 of Fig. 1;

Fig. 3 is a perspective view similar to Fig. 1 showing the removal of the ring with the tab;

Fig. 4 is an exploded perspective view of a grooved shaft and ring, wherein the parts are in disassembled relationship;

Figs. 5–8 are fragmentary sectional views similar to a portion of Fig. 2, showing various embodiments of the invention herein;

Fig. 9 is a plan view of a ring similar to that shown in Fig. 4, but of smaller diameter;

Fig. 10 is a perspective view showing an embodiment of the invention herein including the ring as part of a cap structure; and Fig. 11 is a sectional view of the embodiment shown in Fig. 10 with the cap fitted over a grooved shaft.

Referring now to the drawings more in detail wherein like numerals have been employed to designate similar parts throughout the various figures, it will be seen that the present invention is used in connection with work pieces or members generally designated 12. The work pieces may be of any material, and as shown consist of an inner member 14, with cover sheets or panels 16 and 18. It is to be understood that the particular arrangement shown is merely illustrative, and that any number of work pieces may be employed, but it is preferred that forces normal to the surfaces of the work pieces and tending to move the work pieces apart be not too great.

The work pieces are apertured in alignment at 20, and through the aligned apertures is placed a shaft, pin, post or stud member 22. The stud member may be of any size suitable to fit apertures of varying diameters in work pieces. The stud member 22, as shown in Fig. 2, consists of an abutment member 24 larger in diameter or transverse dimension than the apertures 20, a central shaft or shank portion 26, a circumferentially grooved portion 28, and a terminal portion 30. The abutment member 24, as shown, is similar in character to the head of a screw, but it may assume any form such as a hook, cotter pin, flange or other abutment means. The post member 22 may be of any suitable material, for example metal, wood or plastic.

The groove 28, as noted, is circumferentially disposed about the shaft member 26 and is of a depth sufficient to provide adequate support for the retaining ring 32 to be described hereinafter.

The terminal portion 30 of the shaft or post 22 is merely a continuation of the shank beyond the retaining ring 32 and is generally of the same diameter as the central portion of the shank 26. The terminal portion of the shaft may be beveled as at 34 to facilitate assembly with the work pieces and with the ring.

The retaining ring 32 is of elastic non-metallic material, such as, for example, polyvinyl chloride. The ring consists of a continuous integral endless body portion 38 with a preferably radially extending integral tab or tabs 40 formed thereon.

The body portion 38 of the ring is adapted to be received in the groove 28 of the stud member 22. As shown in Fig. 2, the body portion 38 is generally circular in axial section and its shape is complementary to the shape of the groove 28.

The integral tab 40 extends radially outward from the outside diameter of the body portion 38. The circumferential width of the tab preferably is greater than its radial extent, and the thickness of the tab is never greater at the outer extremity away from the body portion than it is at the portion immediately adjoining the body portion.

The tab 40 is positioned substantially intermediate the bounding planes normal to the axis of the ring. The thickness of the tab is a matter of choice, and should be thin enough to provide access for a tool or finger between the panel 18 and the tab 40 without forcing.

The whole ring 32 being of elastic material is flexible, and therefore, the tab 40 being of thinner cross-section than the body portion can be bent out away from the panel 18 to facilitate the gripping of the tab.

In certain applications, to prevent the tab from breaking off, it has been found desirable to thicken the tab at the root as at 41, thereby providing a fillet or increased area at the point of attachment between the tab 40 and the body portion 38. It is to be understood that the ring may be made without the fillet if so desired.

Whereas only one tab 32 is shown, it is apparent that any desired number of tabs may be used. In certain instances, two or more tabs would be desirable where the shape of the panel 18, or other supported structure, might make it difficult to use a single tab unless unusual care was exhibited in placing the ring over the shaft.

Rings 32 have been made in various sizes, and it is to be noted that as the diameter of the ring decreases there is not a proportionate decrease in the transverse sectional area of the body portion 38. As shown in Figs. 4 and 9, the diameter of a cross-section area of the ring 32 in Fig. 4 is smaller in comparison with the outer diameter of the ring, than is the transverse area of the smaller ring 32s in Fig. 9 to its outer diameter.

The retaining rings here under consideration are formed in two opposed dies through which a molding material such as polyvinyl chloride plastic in liquid form is forced under pressure through a die port or portal. It has been found in manufacturing rings by this process that two weakened areas in the rings are likely, the first occurring at the place on the ring where the die port is located, and the other at the portion of the ring farthest away from the die port. The weakening at the die port results from the pulling off of the stem extending into the port, sometimes making the ring of reduced transverse diameter at this point or causing a slight depression.

The other point of weakness is occasioned by the fact that the liquid plastic as it travels toward the extremity of the mold becomes cooled and is therefore less homogenous and uniform than at the other side of the ring. This sometimes results in deformed or weakened places in the ring.

To meet the difficulties referred to above, and particularly the weakening of the portion of the ring away from the die port, the tab of the ring herein is positioned at the point of possible weakness. By so positioning the tab, it serves to bridge the area of weakness and strengthen the same.

It is obvious that the point of possible weakness at the die port could likewise be reinforced by placing the tab at that point. Multiple tabs are contemplated by the present invention, and by positioning the second tab adjacent the die port, both points of possible weakness could be reinforced.

Whereas forming a ring of circular transverse section is the preferred embodiment of the invention herein, the invention is not to be restricted to that configuration.

As shown in Fig. 5, a modified ring 32a has the body portion 38a formed with two opposite flat side portions 42 and 44, and two rounded corners 46 and 48. This embodiment also has a square corner 50. It is to be noted that the grooved portion 28a of the shaft member 22a is shaped complementary to the configuration of the transverse section of the ring. The tab 40a remains as previously disclosed.

Side 42 is made flat because in so doing it may be used as a bearing for a mating part on the shaft. Corner 50 is square in order to provide additional strength and prevent accidental removal of the ring from the groove. The flat side and square corner further prevent camming of the ring out of the groove by axial loads. The rounded corner 46 provides a lead-in for the ring over the shaft. It will be seen that this embodiment has features and advantages not to be found in the ring of circular axial section.

Another embodiment is shown in Fig. 6, wherein the transverse section of the ring 32b is elliptical and the tab 40b remains unchanged. The ellipse is formed with the longer axis perpendicular to the axis of the shaft. The elliptical section has the advantage that the ring may be deeply embedded into the groove thereby having excellent retaining qualities, but being readily removable by means of the tab 40b, while at the same time having a substantial area extending radially beyond the periphery of the outside diameter of the shaft. Rings formed in this manner may be used on shafts where a wide groove is impractical.

Fig. 7 represents a third embodiment, and as will be noted the transverse section of the ring 32c assumes the shape of a three-quarters section of a circle with the tab 40c attached as in the preferred embodiment. A sharp corner or internal shoulder 52 is provided, together with the cut out portion including sides 54 and 56.

The cut out portion is advantageous in that it prevents the ring from rolling or camming out of the groove. The groove in the shaft 28c takes the form of a quarter circle, complementary to the portion of the ring fitted thereon. The ring is rounded as at 58 to provide a lead-in over the shaft 22c.

Still another embodiment of my invention is shown in Fig. 8, wherein the embodiments of Figs 5 and 7 are combined in such a manner as to provide a transverse section wherein the portion of the ring 32d engaging the groove 28d is in the form of a quarter circle 59, and the portion of the ring external of the groove 28d has square sides 60 and 62, and a flat top portion 64. The tab 40d projects from the flat top 64.

The flat sides 60 and 62 provide bearing surfaces for mating parts on the shaft, and the sharp corner or internal shoulder 66 prevents the ring from rolling out of the groove 28d. The advantage of this embodiment is that it provides for two bearing surfaces and at the same time may be readily positioned over the shaft.

Still another embodiment of the invention herein is shown in Figs. 10 and 11, wherein the ring is formed integral with a cap structure to be fitted over the end of a post or shaft. The cap 65, as shown, has an outside configuration 66 in the shape of one-half of an ellipse. At the end 68 of the cap there is formed on the inside thereof a lip or ring 70, which fits into groove 72 in shaft 22e, which is shaped complementary to the shape of the lip 70. As shown, the lip 70 in section is in the form of one-half of a circle, but it will be understood that it can be shaped in any desirable manner to fit a variety of grooves, such as for example those shown in Figs. 5–8. The inside of the cap, extending inwardly from the lip 70 takes the form of substantially a one-half circle 74, the diameter of this circle being slightly greater than the outside diameter of shaft or post 22e.

The advantages of this embodiment are that the end of the shaft 22e is protected from damage, and a more pleasing appearance results than that with the shaft visible. There is the additional factor that dirt and dust, or other deteriorating materials, are kept away from the extremity of the shaft. It is further to be noted that end 68 provides a bearing surface for a mating part on the shaft. Obviously this embodiment may be used in any device calling for a cap structure and is not limited to installations in which a ring alone is required. Tab 40e depends from and is integral with the outside 66 of the cap.

In the various embodiments shown in Figs. 5–8 it is to be noted that the integral tab is provided in the same form as in the preferred embodiment of Figs. 1–4 to facilitate removal of the ring from the shaft.

The invention illustrated herein contemplates a means for holding a shaft, stud, post or pin against axial displacement. The members to be held together, for example the work pieces 14, 16 and 18, are apertured as at 20, with the apertures axially aligned so as to permit the entry of the post member 22 therethrough as heretofore fully set forth.

The post member 22 is inserted into apertures 20, and the abutment member 24 of the post member 22 engages the outside of work piece 16. The circumferentially continuous groove 28 is cut into the post member at a position adjoining the outside of panel 18. Depending on the thickness of the work pieces, it is obvious that groove 28 may be cut at any place on the post 22.

The elastic retaining ring 32 is then lead over end 36 of the shaft member 30, and the beveled corner 34 and is moved axially of the shaft portion 30 until it reaches the groove 28, at which time it snaps into place. Once in position, the portion of the ring external of the groove 28 serves as an abutment to retain the work pieces in assembled relationship, and to prevent axial displacement of the shaft. As set forth previously, the ring may be of any desired transverse cross-sectional configuration to fit complementary grooves and commercial requirements.

If it is desired to disassemble the parts, the tab 40 is gripped by the thumb and forefinger of an operator as shown in Fig. 3. The elastic ring 32 is stretched to remove the same from groove 28, and the ring is then moved axially away from the work pieces over the end 36 of the shaft. If a small ring is used, for example the ring 32s shown in Fig. 9, it might be desirable to grasp the tab 40s with a tool such as a pliers to facilitate the removal of the ring.

It is to be noted that no damage is done to the ring when it is removed by the tab, and it may be used over and over. The material from which the ring is made is grease, oil, and water resistant, and therefore is not damaged under conditions involving these materials.

Obviously, the invention is not limited to the specific structural features disclosed herein but is capable of other modifications and changes without departing from the spirit and scope of the appended claims.

The invention is hereby claimed as follows:

1. An elastic retaining ring of plastic material adapted to be mounted on an object having an enlargement adjacent one end thereof with a radially extending surface thereon providing a radially outwardly extending shoulder portion, comprising a continuous body member in the form of an annulus, said body member in cross-section presenting a surface which diverges outwardly axially of said ring to provide a cam surface substantially throughout one quadrant of the inner one-half portion of said ring, the other quadrant in cross-section of said ring on the inner one-half portion presenting a relatively abrupt shoulder portion to engage the radially extending surface of the enlargement on the complementary object to assure positive engagement of said ring on said object relative to the enlargement, and an integral tab portion spaced axially from the side of the body portion having the diverging surface and extending radially outwardly from said body member but of lesser thickness than said body member axially thereof and of sufficient circumferential extent so that it may be readily grasped to stretch the aforementioned body member and the abrupt shoulder portion thereon beyond the radially outwardly extending shoulder portion of the complementary object to facilitate dismounting of said elastic retaining ring.

2. An elastic retaining ring as set forth in claim 1 wherein the cam surface is arcuate, being convex outwardly, and wherein the shoulder portion is provided by a substantially flat surface lying in a plane perpendicular to the axis of the ring and intersecting the radially inner surface of the ring at an angle not greater than substantially ninety degrees.

3. An elastic retaining ring as set forth in claim 2 wherein the plane on which the shoulder portion lies is disposed intermediate a pair of planes perpendicular to the axis of the ring at the axial extremities of said ring, and wherein the shoulder portion traverses substantially at least 50% of the radial extent of the body member.

References Cited in the file of this patent

UNITED STATES PATENTS

| | | |
|---|---|---|
| 1,201,082 | Nussbaumer | Oct. 10, 1916 |
| 1,430,685 | Sampson | Oct. 3, 1922 |
| 2,142,590 | Smith | Jan. 3, 1939 |
| 2,416,852 | Schaaff et al. | Mar. 4, 1947 |
| 2,456,355 | Aber | Dec. 14, 1948 |
| 2,462,596 | Bent | Feb. 22, 1949 |

FOREIGN PATENTS

| | | |
|---|---|---|
| 532,906 | Great Britain | Feb. 3, 1941 |
| 693,027 | Great Britain | June 17, 1952 |